United States Patent [19]
Eastcott

[11] Patent Number: 5,592,331
[45] Date of Patent: Jan. 7, 1997

[54] OPTICAL ADAPTER FOR CONTROLLING THE ANGLE OF THE PLANE OF FOCUS

[76] Inventor: John Eastcott, 151 Eagle's Nest Rd., Hurley, N.Y. 12443

[21] Appl. No.: 374,248

[22] Filed: Jan. 18, 1995

[51] Int. Cl.$^6$ .................................................. G02B 27/64
[52] U.S. Cl. ........................................ 359/554; 359/557
[58] Field of Search .................................. 359/554–557, 359/433

[56] References Cited

U.S. PATENT DOCUMENTS

| | | | |
|---|---|---|---|
| 5,069,537 | 12/1991 | Kitagishi | 359/557 |
| 5,073,017 | 12/1991 | Suda | 359/557 |
| 5,172,268 | 12/1992 | Kikuchi | 359/557 |
| 5,194,988 | 3/1993 | Flother et al. | 359/554 |
| 5,270,857 | 12/1993 | Oizumi et al. | 359/554 |
| 5,280,387 | 1/1994 | Maruyama | 359/554 |

Primary Examiner—Timothy P. Callahan
Assistant Examiner—Eunja Shin
Attorney, Agent, or Firm—Eliot S. Gerber

[57] ABSTRACT

An adapter for an optical instrument to control the angle of the plane of focus of the instrument. The adapter has front and rear coupling faces, a secondary lens and a tilt-swing mechanism or a fixed tilt. The adapter's rear coupling face is connected to the optical instrument, an interchangeable primary lens is connected to the front coupling face of the adapter and the tilt-swing mechanism tilts or swings the primary lens relative to the image plane. The tilt-swing mechanism, which controls the angle of the plane of focus, would allow, among other things, for the utilization of Scheimflug's principle.

28 Claims, 2 Drawing Sheets

OPTICAL ADAPTER FOR CONTROLLING THE ANGLE OF THE PLANE OF FOCUS

BACKGROUND OF THE INVENTION

The present invention relates to image-producing optical instruments, such as cameras, and more particularly to an accessory optical adapter for controlling the angle of the plane of focus relative to the image plane of such instruments.

RELATED ART

At the present time a number of optical instruments are used to produce images. In these instruments, a primary lens, which may be a compound lens made of lens elements, produces an image on a light-sensitive surface placed at the image plane. For example, a photographic camera produces an image on a photographic film positioned at the image plane (film plane) of the camera and a video camera produces an image at its light-sensitive image plane, typically an array of CCD (Charge Couple Device), which it then converts into electrical signals.

In more versatile optical instruments, the primary lens is removable, i.e., "interchangeable", so it can be replaced with another lens which has different optical properties. For example, a 35 mm camera may have a set of primary lenses with different focal lengths and different maximum apertures, which could include a wide-angle 24 mm lens, two standard 50 mm lenses (one with a maximum aperture of f.2 and another with a maximum aperture of f.1.2), a tele-photo 400 mm lens, and a 70–210 mm zoom lens.

To make a sharply focused photograph, a camera lens must be of good quality and capable of producing a sharp image. Equally important, the image must be accurately focused on the light-sensitive surface inside the camera. Yet even when sharply focused, no lens is perfect. The image of a tiny point of light, such as a star, will be a small blurred disk called "a circle of confusion" but for most people a circle of 1/1000 in. or less, seen from 10 in. away, will appear to be a sharp point. Thus, if a lens can produce photographs with this degree of resolution, it is considered sharp.

Focusing is obtained by moving the lens closer or further away from the image plane. When focused on subjects such as distant landscapes, which are said to be at optical infinity, the lens is the closest to the image plane. Optical infinity for standard focal length lenses means more than 100 ft. away. Focusing on subjects closer than infinity requires moving the lens further away from the image plane, which is usually accomplished by rotating a helical thread focusing ring found on most camera lenses, or by moving the entire camera front together with the lens, as in cameras with bellows.

A lens can be precisely focused on only one plane at a time. The plane within a scene that is most sharply focused is called the plane of focus. The further an object is from the plane of focus, the more "out of focus" or "blurred" its image will be. Within certain limits, objects located near the plane of focus will look acceptably sharp. This range of acceptable focus is called "depth of field".

It is well known that a larger lens aperture (smaller f. number) produces a shallower depth of field. Conversely, the smaller the aperture (larger the f. number) the greater the depth of field. A lens's f. number is obtained by dividing the focal length of the lens by the diameter of the opening through which the light passes through the lens. An iris inside the lens allows the aperture to be varied. For example, a 50 mm lens with the iris set to a diameter of 12.5 mm is said to be at f.4. A standard lens focused at 10 ft. might have a depth of field from about 7 to 20 ft. at f.16 but only from about 9 to 11.5 ft. at f.4. While great depth of field can be used to make most of the elements in a photograph sharp, limited depth of field can emphasize a sharply focused subject against an indistinct background. For example, when photographing a meadow of daisies, one may focus on the most visible flowers closest to the camera. But if the focus is on the foreground, the background daisies will not be sharp—and vice versa. A compromise focus—aimed at the middle of the daisy meadow—might be all right if one uses a small lens aperture to increase the depth of field. But this would decrease the amount of light passing through the lens, thus requiring a longer exposure. And since daisies tend to move in the breeze during long exposures, this solution may not be practical.

The extent to which the depth of field can be altered by changing the lens aperture is limited by other factors as well. Often, the aperture cannot be made small enough for a really extensive depth of field. As a result, objects close to the lens plane, as well as those far from it, cannot be all rendered sharp in the same image. Also, small apertures which increase the depth of field can result in an unsatisfactory degradation of the image due to "diffraction". They can also cause the undesirable darkening of the image, which may interfere with the operator's ability to see and record it.

In the majority of image recording instruments, the optical axis passes through the center of the image-recording area and is fixed in a position perpendicular to the image plane. In most of these instruments, the image plane (film or CCD plane), the lens plane and the plane of focus are parallel to each other, while in the others mirrors or prisms along the optical axis deflect the image, usually by 90°. Images produced by either means are indistinguishable from each other, assuming they are identically transposed. Since in both instrument types the optical principles are the same, any following mention of a recording instrument with its lens plane and image plane fixed parallel to each other will apply to both types. When using such instruments to photograph the meadow of daisies, the problem of trying to get all daisies in focus is exasperated because the image plane, the lens plane and the plane of focus are approximately perpendicular to the virtually horizontal meadow we want to render sharp throughout.

As opposed to the majority of image recording instruments described above, such as large professional cameras, often called "view cameras", allow the lens plane and image plane to be displaced, so they are no longer parallel. This changes the plane of focus. In the past, view cameras were large contraptions used for photographing landscapes and other extensive views. Today the term describes cameras which allow for rotational and translational movements of the lens relative to the film plane. To permit these movements, the view camera body has a front panel to which the lens is mounted, a rear panel to which a film holder is attached, a rigid base on which both panels can move and rotate, and flexible bellows joining the panels and making the space between the moving panels light-tight. Although their optical properties are good, view cameras are heavy, slow to operate, and should be mounted on a tripod or camera stand. They are designed primarily for sheet film, most often 4×5 and 8×10 in. sizes, but with an adapter they can usually take roll film as well.

While simpler view cameras allow only a small range of movements, the advanced models permit almost unlimited movements, customarily called "tilt", "swing", "rise-and-fall" and "shift". These movements alter the relationship between the lens plane and the image plane. "Shifts" and "rises-and-falls" of either one or both planes are linear movements. They alter the placement of the image recording areas within the image field and are usually employed to control the distortion of an image, particularly in recording tall, rectangular objects, such as buildings. "Tilts" and "swings" are rotational movements used to alter the angle of the lens plane or image plane, or both. As a result, they control the plane of focus. A tilt is a rotational movement about a horizontal axis and a swing is a rotational movement about a vertical axis.

Besides view cameras which permit such movements, there are also commercially available special lenses which incorporate some or all of these movements within their mounting and housing structures. But these lenses are available only in a limited range of focal lengths, fit a limited number of instruments and are expensive.

The tilt and swing movements described above allow utilization of "Scheimpflug's principle". This well-established optical principle states that when the lens plane, subject plane and image plane all intersect along a common line, the entire subject plane is in focus. In other words, when these conditions are met the subject plane and the plane of focus become the same plane. Therefore, in photographing the meadow of daisies, if the lens can be tilted until the plane of focus is made as parallel and close to the daisies as possible, that plane will intersect the extension of the image plane and the lens plane along a common line and all flowers can be rendered very sharp. The problem of having to rely solely on controlling the aperture to achieve the desired sharpness throughout the image has been overcome. Instead of increasing the depth of field by using a small aperture, the plane of focus has been altered to better conform to the subject plane (the meadow of daisies). A wider aperture and consequently faster shutter speed can now be used without impairing the sharpness of the image. Although technically only the plane of focus has been altered and not the depth of field, to a casual viewer it appears that the depth of field has been significantly extended because objects close and far from the camera are rendered sharp. Even photographers often mistakenly say that tilting the lens increases the depth of field. It does not. If they were to use a large aperture with limited depth of field, tilt their lens so as to focus sharply on all the daisies and then also include a man standing close enough to the camera that his head and feet reached from the top of the picture to its bottom, they would discover that his legs at the level of the flowers would be sharp, but his head would not. His head would be too far from the plane of focus to fall within the depth of field achieved with the chosen aperture.

Tilting a lens relative to the image plane to alter the plane of focus opens many possibilities. Besides bringing objects positioned at different distances from the lens into focus simultaneously, a user can also render objects positioned at the same distance from the lens plane with different degrees of sharpness. For example, a portrait of a person facing the camera may be recorded with one side of the face sharp and the other mysteriously soft and out of focus.

Yet it is important to remember that as useful as it is, the Scheimplflug principle cannot be utilized in most hand-held photographic or video cameras or in most large commercial movie and television broadcasting cameras, because their primary lens plane and image plane are parallel, and neither tilts relative to the other.

U.S. Pat. No. 2,286,768 to Drucker describes insertion of an objective (primary) lens of a camera or enlarger into a ball and socket type mount. The lens and mount are then connected to a camera or enlarger, and the lens can rotate and tilt. Similar methods employed in adapters for optical instruments exist. Unfortunately, they increase the physical distance between the lens and the image plane. In most instruments where the lens plane and image plane are fixed and parallel to each other, this increase cannot be compensated for and an instrument's primary lenses can no longer be focused to infinity.

Similarly, optical adapters known as "tele-extenders" or "tele-converters", which are also inserted between an instrument and its primary lens, increase the physical distance between the lens and the image plane. Such adapters usually multiply the focal length of any primary lens attached to them by a standard factor, most often 1 4 or 2. Through control of the optical formula of the lens, these adapters compensate for this physical increase and still maintain the primary lens's original range of focus. The adapters do not alter the angle of the lens plane relative to the image plane and therefore cannot be used to control the plane of focus.

SUMMARY OF THE INVENTION

The present invention is an optical adapter to be used with conventional photographic cameras and other image-recording instruments with interchangeable lenses. The adapter permits the user to control the angle of the plane of focus relative to the image plane.

Interchangeable lens mounts come in many shapes and sizes. Ordinarily, an optical instrument has a built-in lens mounting port and its interchangeable lens has a lens mount. The lens is coupled with the instrument by inserting the lens mount in the lens mounting port and locking it in place. In bayonet type mounts, which are the most common, three flanges extend from around the lens mount, while the lens mounting port has a ring with three slots through which the flanges can fit. Rotating the lens mount within the lens mounting port allows the flanges to slide behind the slots in the ring. The lens mount and lens mounting port are manufactured to a high degree of precision, so that upon rotation the fit of the flanges behind the ring is snug. A spring-loaded pin locks the lens in place. The lens is removed by releasing the pin and rotating the lens in the opposite direction until it can be pulled free of the instrument.

Lens mounts designs are usually proprietary of the manufacturer of the optical instrument. These mounts often contain electrical contacts and levers to control features incorporated in the design of the instrument, such as aperture, automatic focusing and motorized zooming.

The present invention—an optical adapter—is designed to be sandwiched between an optical instrument and one of its primary lenses. The adapter's body has a front face with a lens mount port of the same design as the lens mount port of the instrument to which it is being connected, and a rear face with a lens mount of the same design as the lens mount of an instrument's primary lens. The adapter is connected to the instrument in the same manner a primary lens would be, i.e., the lens mount on the adapter's rear face is coupled to the instrument's lens mounting port. The primary lens is then attached to the adapter in the same manner in which it is usually connected to the instrument, i.e., the lens mount of the primary lens is coupled to the lens mounting port on the adapter's front face.

Insertion of the adapter between the primary lens and the instrument moves the primary lens away from the image plane by a distance equal to the distance between the front and rear face of the adapter. To compensate for this displacement and allow the primary lens to focus over the range of distances it was designed for, the adapter houses a secondary lens. The optical design of a secondary lens capable of achieving this compensation would normally comprise of a compound lens of three to seven elements. Such designs are employed in optical adapters known as "tele-extenders" or "tele-converters". This type of compound secondary lens multiplies the focal length of any primary lens attached to it by a standard factor, most often 1.4 or 2, while still maintaining the primary lens's original range of focus. The preferred design of the adapter's lens would multiply the focal length of any lens it is attached to by a factor ranging from 1.2 to 3, and enlarge the image field of the primary lens.

The adapter body has a tilt mechanism which allows a portion of the body to be tilted relative to the image plane, i.e., the light sensitive surface of the instrument. The secondary lens is preferably held in the tiltable portion of the adapter's body. The secondary lens can also be held in the non-tilting portion of the adapter's body, since it is rotation of the primary lens plane relative to the image plane which controls the plane of focus. Once the desired amount of tilt has been achieved, it can be locked in place.

In a more economical embodiment, the degree of tilt could be fixed at a given angle. While such an embodiment would lack the precision and versatility of one with an adjustable tilt, there are many instances where even a small degree of tilt (three to six degrees) can significantly improve the location of the plane of focus relative to the subject recorded.

Many optical instruments have a rectangular image recording surface. Some instruments are used to record both horizontal and vertical images of subjects. The adapter body has a means of allowing the lens mount on its rear face to rotate independently of the rest of the adapter. This allows the instrument to record images both horizontally or vertically without disturbing the tilt. By rotating the instrument, the adapter, and the primary lens as a single unit, the adapter's "tilt" can become a "swing".

The adapter is readily installed and removed. There is no need to modify the instrument or its primary lens with which it is used. By facilitating tilt/swing movements of the primary lens relative to the image plane of instruments, the user is now able to take advantage of Scheimpflug's principle to control the plane of focus. The adapter is intended to be used with existing, or yet to be designed, interchangeable lenses (including wide-angle, standard, tele-photo and zoom) which fit optical instruments, such as cameras with interchangeable lens mounts. The adapter is relatively small, lightweight and easy to operate, making it advantageous to have in a studio or take into the field. By introducing control of the plane of focus to instruments presently lacking such control, the adapter creates new opportunities in the way images can be perceived, created and recorded.

DETAILED DESCRIPTION

Figure 1A:
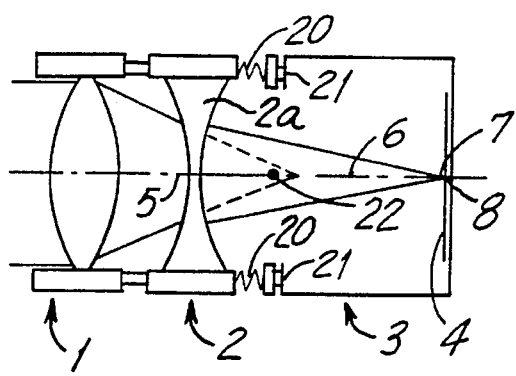
FIGS. 1a–3b are side cross-sectional views of three embodiments showing the adapter of the present invention.

The following description shows some of the possible ways of achieving tilts and swings in the adapter 2 of the present invention. They result in an angular displacement (tilt-swing) of the primary lens 1 in relation to the image recording area 4 (image plane). "Scheimpflug's principle" can be utilized if the displacement occurs on either side of the secondary lens 2a. In other words, a method which permits the desired angular displacement (tilt-swing) of the primary lens 1 in relation to the image plane recording area 4 and the normal optical axis 6 of the image recording instrument can occur: (a) between the secondary lens 2a and the image recording area 4; (b) between the primary lens 1 and secondary lens 2a, or (c) in both a and b. Generally, the preferred location will be (a) and in the drawings this is the preferred method of illustrating the concept. These methods can be used to effect a single movement (tilt or swing) or combined to effect a combination of movements (tilt with swing). To control the orientation of the angular displacement (tilt-swing) of the primary lens 1 relative to the orientation of the image recording area 4, these methods can be used in conjunction with a rotation ring 21 (in the drawings it is located at the rear of the adapter 2 where it connects to the image recording instrument 3) to rotate the image recording area 4 around the instrument's optical axis 6 and perpendicular to the center of the image-recording area 8.

Figure 1B:
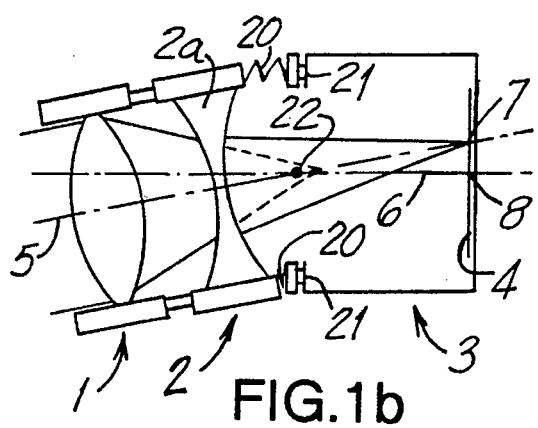

In the first embodiment shown in FIGS. 1a and 1b, a simple pivot is employed along an axis in a plane perpendicular to the primary lens optical axis 5. The actual location of the pivot may be determined by mechanical, optical or economic considerations. Comparison of FIGS. 1a and 1b illustrates the principle. The primary lens 1 and the secondary lens 2a form an image within an image recording instrument 3, for example, a camera, on an image recording area 4, for example, a film plane. A simple light baffle 20 (in this case a bellows) keeps all light from entering the system, except for the light passing through the optics and forming the image. A pivot is incorporated along an axis 22, in this case between the secondary lens 2a and the image recording instrument 3. The adapter 2 includes the secondary lens 2a, light baffle 20 and rotation ring 21. FIG. 1a illustrates the system with no tilt, so that the center of the optical field 7 coincides with the center of the image recording area 8, while FIG. 1b shows implementation of a tilt along an axis 22. Note that the center of the optical field 7 is displaced. The amount of displacement depends on the degree of tilt which has been introduced. The optical configuration of the secondary lens 2a should increase the field image area to accommodate such displacements.

Figure 2A:
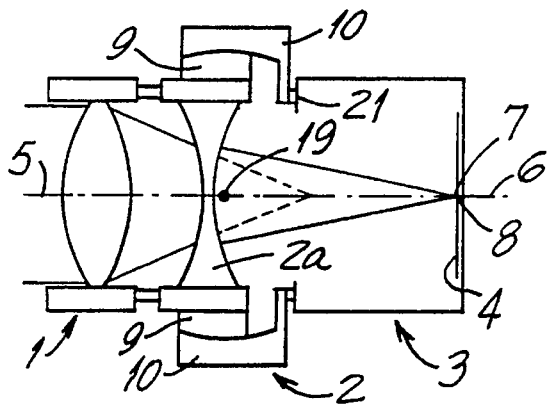
Figure 2B:
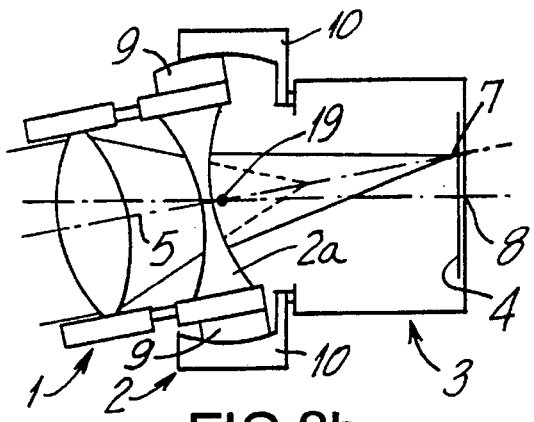

In the embodiment of FIGS. 2a and 2b a simple ball and socket mechanism surrounds the secondary lens 2a. This would allow both tilts and swings to be included in one mechanism. Also, the integrity of the system remains light-tight except for the image forming rays passing through the primary lens 1. No additional bellows or light baffles are needed. Comparison of FIGS. 2a and 2b illustrates the principle. A ball-type mechanism 9, having a partial spherical surface (part of a sphere) surrounds and is attached to the ring holding the secondary lens 2a. A socket mechanism 10, removably coupled to the recording instrument 3, is fitted around the ball-type mechanism 9 to form a standard ball and socket joint. The primary lens 1 and the secondary lens 2a are able to rotate, as illustrated in FIGS. 2a and 2b. As in FIGS. 1a and 1b, the center of the optical field 7 is displaced, which depends on the degree of tilt. In this example, the axis or point of rotation 19 is located approximately midway between the front and rear of the secondary lens 2a. As with the first embodiment, to avoid loss of image quality, particularly at points on the image recording area 4 furthest from the center of the optical field 7, the optical configuration of the secondary lens 2a should be such that it increases the field image area to accommodate such displacements. The adapter 2 includes the ball-type mechanism 9, the socket mechanism and the secondary lens 2a.

Figure 3A:
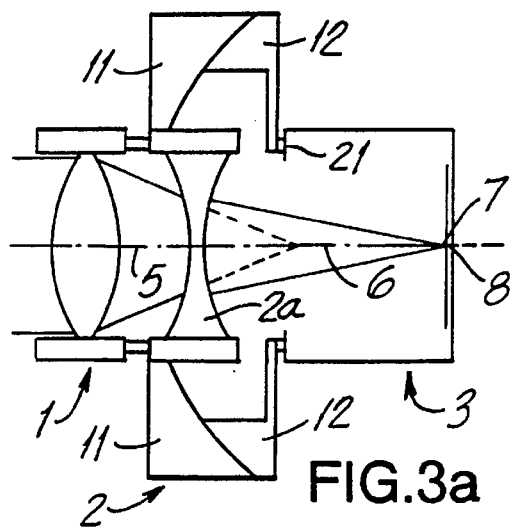
Figure 3B:
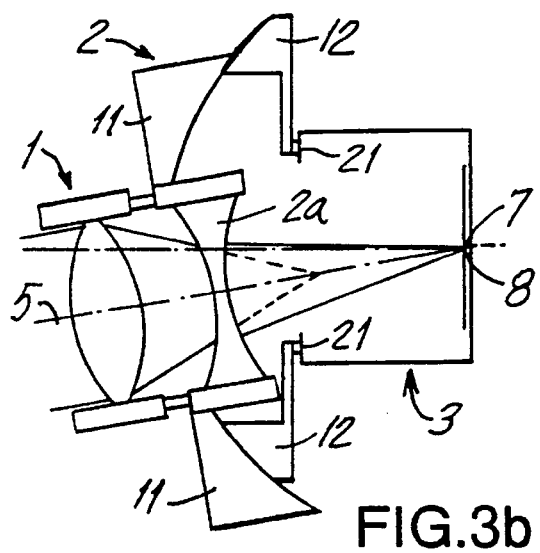

In the embodiment shown in FIGS. 3a and 3b a simple sleeve and rod type mechanism is implemented in which the sleeve may slide relative to the rod. It functions like a ball and socket, but with its movement restricted to a single plane. Comparison of FIGS. 3a and 3b illustrates the principle. The sleeve-like part 11 of the mechanism surrounds the secondary lens 2a and is attached to it, while the rod-like part 12 of the mechanism is removably coupled to the recording instrument 3. These parts are fitted together and held in place using a standard groove-type device, so that the sleeve-like part can rotate around the rod-like part. In FIGS. 3a and 3b, the central axis of the radius of the rotation passes through the center of the optical field 7 along the plane containing the image recording area 4. Thus the center of the optical field 7 is not displaced relative to the center of the image recording area 8 and the need to increase the field image area is reduced. The adapter 2, in this embodiment, includes the secondary lens 2a, rod-like part 12, sleeve-like part 11, and ring 21.

Figure 4A:
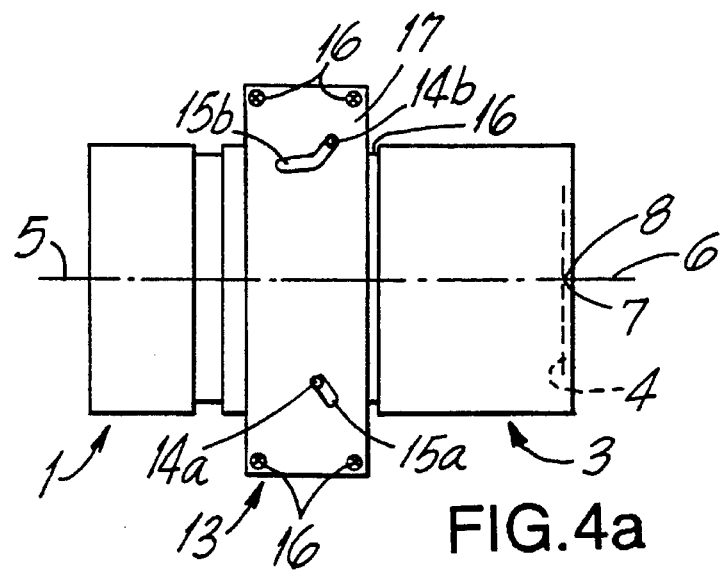
FIGS. 4a–4c are side elevational views of a fourth embodiment showing the adapter of the present invention.
Figure 4B:
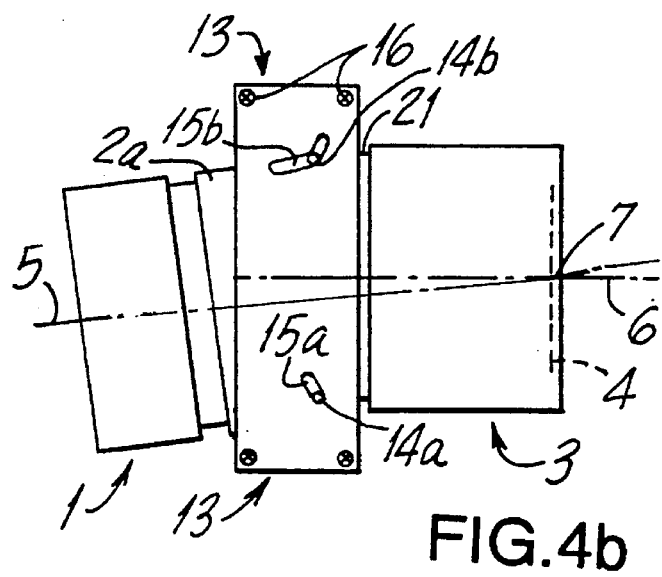
Figure 4C:
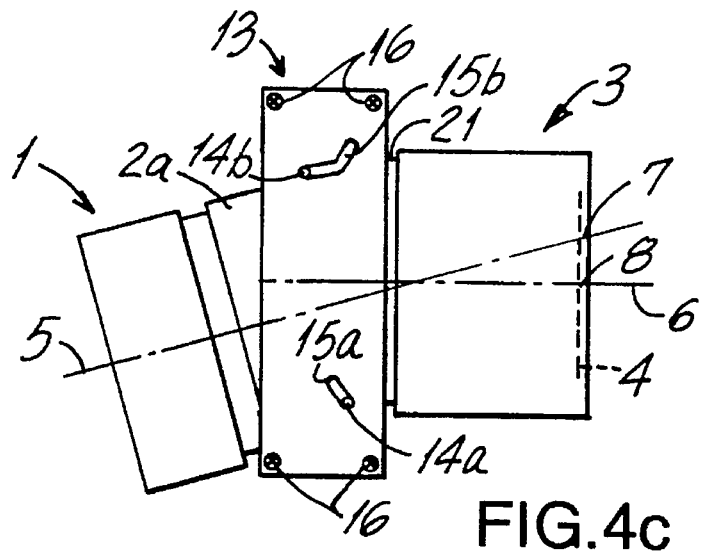

The embodiment of FIGS. 4a, 4b and 4c uses a simple means, employing cams, to direct and control the amount and location of tilt. The use of cams would allow not only the types of angular displacement (tilt-swing) mentioned in the embodiment of FIGS. 1–3 to take place, but would also permit more complicated movements. For example, the angular displacement (tilt-swing) that occurred between FIGS. 3a and 3b could continue further if needed, with a pivot displacement similar to that which occurred between FIGS. 1a and 1b. Comparison of FIGS. 4a, 4b and 4c shows this concept. Here, cam pins 14a and 14b are attached perpendicularly to the secondary lens 2a. The secondary lens 2a is housed in an adapter 13, which can be attached to the image recording instrument 3. Pins 14a and 14b move within cam-grooves 15a and 15b to allow an angular displacement (tilt-swing) of the primary lens 1 in relation to the image recording area 4. The cam-plate 17, with cam-grooves 15a and 15b, is designed to be interchangeable with similar plates having different cam-grooves. Here the plate is removable by undoing four screws 16. FIG. 4a illustrates the adapter with no tilt engaged, so that the center of the optical field 7 coincides with the center of the image recording area 8, while FIG. 4b shows engagement of a tilt, which is accomplished by moving the primary lens 1 and secondary lens 2a in a path dictated by the cam-grooves 15a and 15b until pin 14a reaches its maximum displacement in cam-groove 15a. At the same time pin 14b moves an equal distance within cam-groove 15b. The resulting movement does not alter the center of the optical field 7, which still coincides with the center of the image recording area 8. In FIG. 4c, further movement of the primary lens 1 and secondary lens 2a is shown, this time accomplished by pivoting around pin 14a in its new position, with pin 14b being guided into a continuation of cam-groove 15b, designed to permit such movement. The resulting movement shifts the center of the optical field 7 away from the center of the image recording area 8.

The adapter would normally use only one cam plate. However, by making the cam plate 17 interchangeable it is possible to add to the versatility of the adapter without compromising its portability or simplicity. For example, specialized plates with cam-grooves could be designed to rotate a specific combination of primary lens 1 and secondary lens 2a around their combined rear nodal point. Because different instruments to which the device could be attached may present different design considerations, various plates could be designed to accommodate these differences. The optics that make up the secondary lens 2a could be housed in such a manner as to make them quickly and easily interchangeable with those of another design. This would create even further versatility. Obviously designing different plates for specialized applications and instruments would be easier and cheaper than redesigning the adapter for each instrument.

Modifications may be made in the present invention within the scope of the claims. The following features could be added to the adapter without comprising the validity of the invention.

1. The physical movements, which permit the desired angular displacement (tilt-swing), could occur either between (a) the secondary lens and the image plane (generally, the preferred location); (b) between the primary and secondary lens; or (c) as a result of a combination of (a) and (b).

2. An optical design of the secondary lens would increase the field image while maintaining or extending the range of focus of any primary lens to which it is attached.

3. A scale to indicate the degree of tilt, so an operator could record and/or reset the angle of tilt. The scale could be used as a reference for an operator to calculate any compensation of exposure which may be needed.

4. A means to automate control of the degree of tilt of the adapter. In cinematography and video, the possibility of automating such movement as a function of other functions, including time, could also be utilized. Thus, for example, a scene with foreground, mid-ground and background could be all recorded in sharp focus by the use of tilt. Then, as the operator zooms in and pans up to mid-ground, background and finally just the background, the tilt could be automatically modified so the plane of focus was commensurate with need.

5. Means of maintaining and/or controlling linkages which might be used for the relay of information and/or mechanism movement and which already exist between the primary lens and the image recording instrument, i.e., the camera. Typically, such linkages control aperture, focus and focal length.

6. A means to allow control of the orientation of the angular displacement (tilt-swing) relative to the orientation of the image recording area.

7. A means to adjust a tilt movement of the adapter and then lock in the tilt position.

8. The adapter is made with a fixed (predetermined) tilt. This is economical and may be used in a relatively low-cost adapter.

9. A means to connect the adapter to a tripod or stand.

10. A means to automate compensation of exposure dependent on angle of tilt, should such compensation be required.

11. The adapter is made of components, which can be separated and used independently of each other; for example, as an extension tube or as an optical converter.

12. A means to make a secondary lens interchangeable.

13. A means to vary the distance between the front face of the adapter and the back face of the adapter.

What is claimed is:

1. An adapter for altering the angle of the plane of focus of an optical system, the optical system including (a) an optical instrument having an opening through which an image forming beam can pass, an image plane adapted to receive an image thereon and an optical axis, and (b) an interchangeable lens having an optical axis;

the adapter being sandwiched between, and removably connected to, the optical instrument and the interchangeable lens;

the adapter having
(i) an adapter body;
(ii) a secondary lens mounted within the adapter body,
(iii) a front face coupling means on the adapter body to removably mount the interchangeable lens thereto,
(iv) a back face coupling means on the adapter body to removably mount the adapter to the optical instrument, and
(v) tilt means to tilt the optical axis of the interchangeable lens at a variable, including non-perpendicular, angle to the image plane of the optical instrument.

2. An adapter as in claim 1 wherein the adapter tilt means tilts the secondary lens together with the interchangeable lens attached to the front face coupling means of the adapter body and thereby tilts the optical axis of the interchangeable lens at a variable, including non-perpendicular, angle to the image plane of the optical instrument.

3. An adapter as in claim 1 wherein the adapter tilt means tilts the front face coupling means of the adapter body and thereby tilts the optical axis of the interchangeable lens at a variable, including non-perpendicular, angle to the image plane of the optical instrument.

4. An adapter as in claim 1 wherein the adapter tilt means tilts the back face coupling means of the adapter body and thereby tilts the optical axis of the interchangeable lens at a variable, including non-perpendicular, angle to the image plane of the optical instrument.

5. An adapter as in claim 1 wherein the adapter tilt means tilts the front face coupling means of the adapter body and thereby tilts the optical axis of the interchangeable lens at varying angles to the image plane of the optical instrument and also tilts the back face coupling means of the adapter body and thereby tilts the optical axis of the interchangeable lens at a variable, including non-perpendicular, angle to the image plane of the optical instrument.

6. An adapter as in claim 1 wherein the adapter tilt means tilts the secondary lens and the interchangeable lens attached to the front face coupling means of the adapter body and thereby tilts the optical axis of the interchangeable lens at an acute angle to the optical axis of the optical instrument.

7. An adapter as in claim 1 wherein the adapter tilt means tilts the front face coupling means of the adapter body and thereby tilts the optical axis of the interchangeable lens at an acute angle to the optical axis of the optical instrument.

8. An adapter as in claim 1 wherein the adapter tilt means tilts the back face coupling means of the adapter body and thereby tilts the optical axis of the optical instrument at an acute angle to the optical axis of the interchangeable lens.

9. An adapter as in claim 1 wherein the adapter tilt means tilts the secondary lens and the back face coupling means of the adapter body and thereby tilts the optical axis of the optical instrument at an acute angle to the optical axis of the interchangeable lens.

10. An adapter as in claim 1 wherein the adapter tilt means tilts the front face coupling means of the adapter body and also tilts the back face coupling means of the adapter body and thereby tilts the optical axis of the interchangeable lens at an acute angle to the optical axis of the optical instrument.

11. An adapter as in claim 1 wherein the adapter tilt means tilts the front face coupling means at an acute angle to the back face coupling means.

12. An adapter as in claim 1 wherein the adapter tilt means tilts the back face coupling means at an acute angle to the front face coupling means.

13. An adapter as in claim 1 wherein the adapter has a fixed degree of tilt of the front face coupling means of the adapter to which the interchangeable lens is attached and the adapter body thereby tilts the optical axis of the interchangeable lens at an acute angle to the optical axis of the optical instrument.

14. An adapter as in claim 1 wherein the adapter has a fixed degree of tilt of the back face coupling means of the adapter to which the optical instrument is attached and the adapter body thereby tilts the optical axis of the interchangeable lens at an acute angle to the optical axis of the optical instruments.

15. An adapter as in claim 1 wherein the adapter has a fixed degree of tilt on the front face coupling means of the adapter to which the interchangeable lens is attached and the adapter body thereby tilts the optical axis of the interchangeable lens at an acute angle to the optical axis of the optical instrument and a fixed degree of tilt of the back face coupling means of the adapter to which the optical instrument is attached and the adapter body thereby tilts the optical axis of the interchangeable lens at an acute angle to the optical axis of the optical instrument.

16. An adapter as in claim 1 wherein the secondary lens compensates for the displacement of the interchangeable lens from the image plane of the optical instrument when the adapter is positioned between the interchangeable lens and the optical instrument.

17. An adapter as in claim 1 wherein the secondary lens enlarges the image field of the interchangeable lens.

18. An adapter as in claim 1 wherein the optical instrument is a camera and the image plane is a film plane.

19. An adapter as in claim 1 wherein the optical instrument is a video camera and the image plane is a light sensitive transducer.

20. An adapter as in claim 1 wherein the interchangeable lens is selected from the group of wide-angle lenses, standard lenses, telephoto lenses, and zoom lenses.

21. An adapter as in claim 1 wherein the secondary lens is a three, four, five, six or seven element compound lens.

22. An adapter as in claim 1 wherein the secondary lens has a magnification factor in the range of about 1.2 to 3.

23. An adapter as in claim 1 wherein the secondary lens has a magnification factor of about 1.4.

24. An adapter as in claim 1 wherein the front face coupling means is a female of a bayonet connector and the back face coupling means is a male of a bayonet connector.

25. An adapter as in claim 1 wherein the front face coupling means is a male of a bayonet connector and the back face coupling means is a female of a bayonet connector.

26. An adapter as in claim 1 wherein the tilt means includes a mounting ring holding the secondary lens two pins protruding outwardly from the mounting ring and a casing member having two slots therein at acute angles to the optical axis of the optical instrument and wherein each pin slides within one of the slots.

27. An adapter as in claim 1 wherein the tilt means is a ball and socket mechanism comprising a mounting ring holding the secondary lens, a partial spherical member as the ball member having part of an external spherical surface, and a body member as a socket and having part of an internal spherical surface mating with the ball member.

28. An adapter for altering the angle of the plane of focus of an optical system, the optical system including (a) an optical instrument having an opening through which an image forming beam can pass, an image plane adapted to receive an image thereon and an optical axis, and (b) an interchangeable lens having an optical axis;

the adapter being sandwiched between, and removably connected to, the optical instrument and the interchangeable lens;

the adapter having:

(i) a secondary lens, (ii) a front face coupling means to removably mount the interchangeable lens thereto, (iii) a back face coupling to removably mount the adapter to the optical instrument, and (iv) tilt means to tilt the optical axis of the interchangeable lens at an angle to the image plane of the optical instrument.

\* \* \* \* \*